United States Patent [19]

Newton et al.

[11] 3,882,509

[45] May 6, 1975

[54] LINEARITY CORRECTION CIRCUIT FOR AN OPTICAL SCANNING DEVICE

[75] Inventors: John E. Newton; Robert L. Reifsteck, both of Rochester, N.Y.

[73] Assignee: Eastman Kodak Company, Rochester, N.Y.

[22] Filed: Oct. 23, 1973

[21] Appl. No.: 408,350

[52] U.S. Cl. .......... 354/5; 354/7
[51] Int. Cl. .......... B41b 13/00
[58] Field of Search .......... 354/5, 7, 10

[56] References Cited

UNITED STATES PATENTS 2,786,400 3/1957 Peery .......... 354/7
3,434,402 3/1969 McCall .......... 354/7

*Primary Examiner*—John M. Horan
*Attorney, Agent, or Firm*—R. L. Owens

[57] ABSTRACT

Apparatus is disclosed for accurately positioning a beam on a page of recording medium in a printer by means of a galvanometer-driven mirror. Compensation for non-linear operation of the galvanometer-driven mirror is provided by varying the magnitude of a correction voltage input to a galvanometer drive amplifier as a function of the position on the page which the galvanometer mirror is positioning the beam.

3 Claims, 5 Drawing Figures

| NAME | ACCT. NO. |
|---|---|
| ⋮ | |
| JANE A. DOE | 12347 |
| ~~JANE B. DOE~~ | ~~11346~~ |
| ⋮ | ⋮ |
| JOHN A. DOE | 16954 |
| ~~JOHN B DOE~~ | ~~43586~~ |
| ⋮ | ⋮ |

| CORRECTION VOLTAGE | BEAM POSITION ON PAGE |
|---|---|
| $CV_1$ | S1 |
| $CV_2$ | S2 |
| $CV_3$ | S3 |
| ⋮ | ⋮ |
| $CV_n$ | $S_n$ |

LINEARITY CORRECTION CIRCUIT FOR AN OPTICAL SCANNING DEVICE

BACKGROUND OF THE INVENTION

1. Field of the Invention

This invention relates to beam positioning apparatus and, more particularly, to circuitry for compensating for nonlinear beam deflection, in devices utilizing optical scanning, that results from the operating characteristics of a beam positioning device.

2. Description of the Prior Art

The prior art shows numerous types of apparatus that utilize beam positioning devices. An example of one type of such apparatus is a printer in which printing is accomplished by deflecting a beam of radiation to selected positions on a recording medium. More specifically, R. W. Schumann et al., U.S. Pat. No. 3,224,349, issued Dec. 21, 1965, shows a printer in which printing is accomplished by positioning a beam of light on a recording medium by means of two galvanometer-driven mirrors that are rotatable about perpendicular axes. One of the mirrors controls the horizontal placement of characters in a line printed across a page of the recording medium, and the other mirror controls the vertical placement of the lines of characters printed on the page. Positioning of the mirrors is controlled by applying digital code signals representing horizontal and vertical beam position information to a controller which generates drive signals that control the rotation of the galvanometers.

The Schumann patent indicates the existence of a problem when information is being printed on a page in a column format that requires a beam to be moved from the last line of a column at the bottom of a page to the top of the page where the first line of the next column is to be printed. Due to such factors as friction in the galvanometer bearings, the effect of hysteresis, and backlash, the beam may not come to rest at the same vertical location for printing the first line of each column being printed on the page after the required page length vertical displacements in beam position. To insure proper spacing of the lines printed after the printing of the first line in each column, a small constant current is added to the galvanometer drive current when vertically positioning the beam to print all lines on the page except the first line. In essence, the addition of this constant current to the galvanometer drive current shifts the vertical position of all of the lines printed on the page relative to the inaccurately positioned first line.

While the Schumann patent describes circuitry to compensate for the inaccurate positioning of a printed line as a result of non-linear galvanometer operation by altering the position in which succeeding lines are printed, it does not teach how to eliminate the inaccurate positioning of the original line. Furthermore, nothing in the patent indicates the solution of the problem arising from either the shifting of the vertical position of the lines printed after the first line or the inaccurate positioning of such lines as a result of non-linear operation of a beam positioning device. The ability to eliminate inaccurate positioning of lines resulting from non--linear beam positioning device operation becomes very important when precise positioning is required for each of the lines to be printed on a page. For instance, where lines of characters are being printed on microfilm, it is extremely important that the beam used in printing be accurately located in the proper position on a page before printing begins. Inaccurate positioning of the beam, produced by non-linear deflection, can result in partial or total loss of characters where the printing takes place in conjunction with the use of a form slide. That is, if the inaccurate positioning of the beam results in a line of characters being printed on the same line of a page on which an image of a form slide segment is being printed, part or all of these characters will be masked by the recorded image of the form slide segment. Additionally, non-linear positioning of a beam during printing on microfilm can result in a noticeable variation in the distance separating the lines of print in a full-size reproduction of the microfilm.

The problems created by non-linear beam deflection are not limited to the situation discussed in the Schumann patent, where large beam displacements are produced. Many beam positioning devices respond to the successive application of drive signals for producing a succession of small, equal beam displacements but instead produce a series of variable length beam displacements due to non-linear operation of the positioning device. These variable length displacements are unique to the beam positioning device being used, and they may produce the inaccurate beam positioning discussed above which results in the loss of data being printed or noticeable variations in the separation of printed lines.

SUMMARY OF THE INVENTION

The invention overcomes the problems encountered in the prior art by correcting the position of a beam before it is used to print a line of characters and thus substantially eliminates the occurrence of inaccurately positioned lines of print. In accordance with the invention, corrections made in beam position vary in magnitude as a function of the sections of a page in which a beam positioning device positions the beam during a scan of the page. For example, where the beam positioning device is electrically driven, correction voltages can be selected by observing the effects of the non-linear operation of the beam positioning device on beam position as the device positions a beam in each of a number of sections of a plane or page. After these correction voltages are determined, the effects produced by the non-linear operation of the beam positioning device in positioning a beam in a selected section of a page can be compensated for by adding the correction voltage associated with that section of the page to the input of a drive circuit that controls the beam positioning device. As the beam positioning device produces a beam scan passing sequentially through all of the sections of a page, each of the correction voltages is sequentially added to the input of the drive circuit as the beam passes through the page section associated with that voltage. In essence, during a scan of a page, this operation varies beam positioning correction in a manner that is related to the non-linear operating characteristics of the beam positioning device.

It is an object of the invention to improve the accuracy with which a beam may be automatically positioned in a selected plane.

It is another object of the invention to improve the beam positioning accuracy in devices utilizing optical scanning.

It is yet another object of the invention to compensate for the non-linear operating characteristics of a beam positioning device used in a printer.

It is a more specific object of the invention to compensate for the effect of the non-linear operating characteristics of a beam positioning device on the position of a beam used for printing in various sections of a page by supplying corrections in beam position that vary in magnitude as a function of the page section in which the beam is positioned.

It is a still more specific object of the invention to vary the magnitude of a correction voltage applied to an input of a beam positioning device drive circuit as a function of the section of a page in which the device positions a beam.

The invention provides several advantages over the prior art. Where printers are involved, the placement of printed information on a page can be more accurately controlled. Additionally, since the invention compensates for non-linear operating characteristics in a beam positioning device, accurately formatted printing may be obtained with printers utilizing relatively inexpensive beam positioning devices. Finally, problems encountered in the prior art when printing on forms are reduced as a result of the increased accuracy with which a beam may be positioned for printing lines of information. Numerous other advantages and features of the invention will become apparent upon reading the following description of the illustrative embodiment.

DESCRIPTION OF THE ILLUSTRATIVE EMBODIMENT

Figures 1, 2:
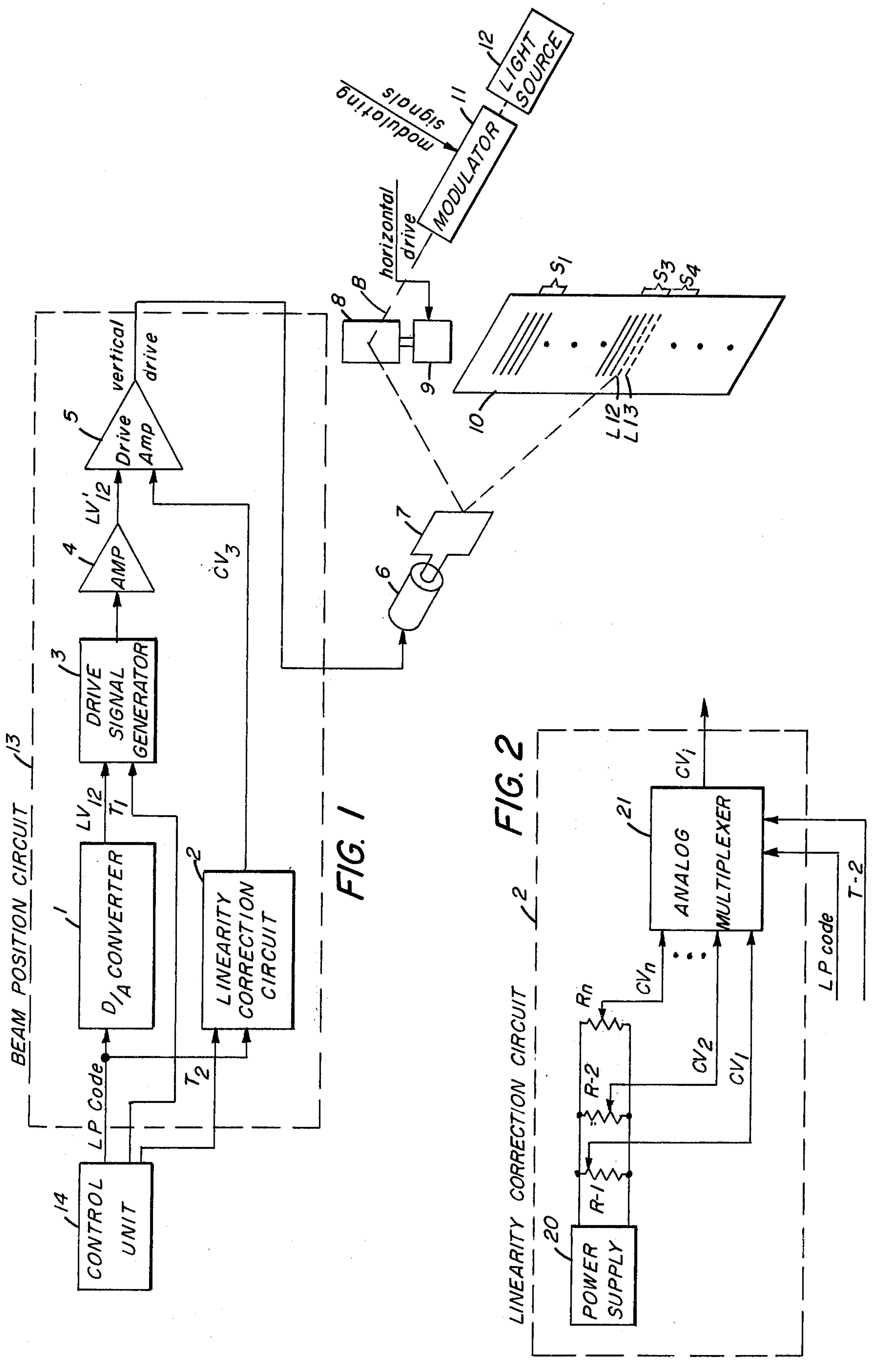
FIG. 1 shows a block diagram of a portion of a printer beam control unit that implements the invention.
FIG. 2 shows a detailed block diagram of a linearity correction circuit shown in FIG. 1.

An illustrative embodiment of the invention is shown in FIG. 1. Generally, when printing is to take place on a page of recording medium 10, drive signals are applied to vertical 6 and horizontal 9 position galvanometers, and this results in mirrors 7 and 8 rotating to position a modulated beam B, generated by the modulator 11, at a desired location on the page. It is common practice in the prior art to maintain the vertical position mirror 7 in a fixed position, while the horizontal position mirror 8 is rotated to produce a horizontal scan of the beam B across the page 10 during which a horizontal line of characters is printed. After a line of characters is printed, the vertical position mirror 7 is rotated through an arc to vertically position the beam B at another location on the page 10 where the next line of characters is to be printed, and the horizontal position mirror is again rotated to produce a horizontal scan of the beam B across the page.

It is apparent that, if the signals identifying a beam position are selected under the assumption that the operation of a beam positioning device to which they are to be applied is linear, any non-linear operation of the positioning device during its use in positioning a beam for printing on a page will result in erroneous positioning of the information printed on the page. Where the beam positioning device is a galvanometer-driven mirror, non-linear operation can result from, for example, bearing friction, non-uniform variations in spring torque, and variations in the uniformity of the parts of the galvanometer. Consequently, the degree of non-linear operation of such devices may continuously vary during a scan of a page and, if not compensated for, may result in the erroneous positioning of information being printed at any point on a page.

Figures 3, 4, 5:
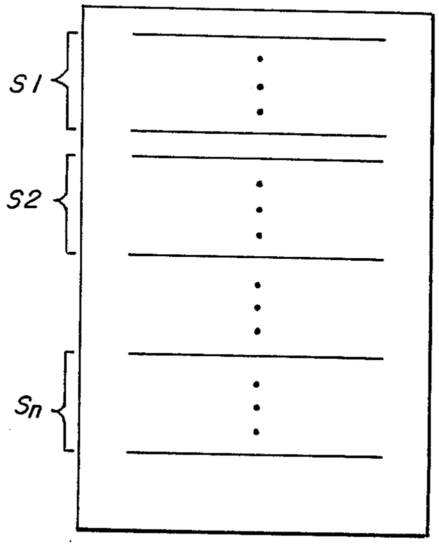
FIG. 3 shows an example of the possible effects of non-linear beam positioning device operation on the positioning of printed lines.
FIG. 4 shows an example of how a page may be viewed as being divided into sections for purposes of implementing the invention.
FIG. 5 shows a chart that correlates the correction voltages applied to a galvanometer drive circuit shown in FIG. 1 with the section of a page in which a beam is positioned.

An example of a printed page produced by a printer in which no compensation is made for the non-linear operation of a vertical beam positioning device, such as the galvanometer-driven mirror 7, is shown in FIG. 3. The page in this example is of a type where a form slide is used to print a form outline on the page at the same time alphanumeric information is being printed within the various divisions of the form. The first line of information is properly printed within the appropriate divisions of the form. However, as the vertical position galvanometer 6 is periodically rotated to position the printer beam for printing succeeding lines of information, the beam position is affected by non-linear operation of the galvanometer 6, and this ultimately results in the JANE B. DOE entry being positioned too far down on the page. This effect of non-linear galvanometer operation can be compensated for by slightly decreasing the amount of current applied to the galvanometer 6 to compensate for its non-linear operation when used to position a beam in this section of the page. Similarly, as the galvanometer 6 is used to vertically position still more lines on the page being printed, the galvanometer operating characteristics again change, resulting in the JOHN B. DOE entry being printed too high on the page. This effect of the non-linear operation of the galvanometer 6 can be compensated for by slightly increasing the amount of current applied to the galvanometer 6 while it is positioning a beam in this section of the page.

As indicated above, the variations in beam position resulting from the non-linear operation of the galvanometer 6 may be substantially eliminated by slightly varying the drive current applied to the galvanometer to compensate for non-linear galvanometer operation. This can be accomplished by increasing or decreasing the voltage applied at one input of a galvanometer drive amplifier 5 (FIG. 1) as the galvanometer is used to position the beam B at various locations on the page 10. More specifically, the drive current generated by the galvanometer drive amplifier 5, which is a summing amplifier, may be varied by varying the magnitude of a correction voltage $CV_i$ that is added to a vertical position voltage $LV'_i$ input to the amplifier. The correction voltages $CV_1$ through $CV_n$ (FIG. 5) are empirically determined by dividing a page into sections S1 through $S_n$ (FIG. 4) and determining the correction voltage magnitude necessary to compensate for non-linear galvanometer operation as the galvanometer positions the beam B in each of these sections. Obviously, the size of the page sections selected will depend on the characteristics of the beam positioning device being used and the degree of accuracy desired in beam positioning. The length of each of the sections may encompass an equal number of lines of print, or the section lengths may vary. Similarly, where extremely high beam position accuracy is desired, a section length may be limited to include only one line, and a correction voltage may be determined for each line to be printed on a page. Normally, however, the operating characteristics of the beam positioning device, and the beam positioning accuracy requirements are such that a page section encompasses a portion of the page on which several lines of information can be printed. The empirically determined correction voltage magnitudes $CV_1$ through $CV_n$ are used to calibrate a linearity correction circuit 2 (FIG. 1) which responds to line position code information by selecting the correction voltage $CV_i$ to be applied as an input to the galvanometer drive amplifier 5.

For purposes of discussion, it will be assumed that the page 10 is divided into four line sections and a correction voltage is determined for each of these sections. When the vertical position of the beam B is to be changed in preparation for the printing of a new line of information, such as line L12 in section S3 on the page 10, the control unit 14 generates a timing signal T1 and a digital code LP representing the vertical position of line L12. The digital code LP is applied to the digital-to-analog converter 1 and the linearity correction circuit 2. The digital-to-analog converter 1 converts the digital code LP into an analog voltage $LV_{12}$ that is applied to a drive signal generator 3. The drive signal generator 3, which may be any one of numerous prior art circuits, responds to the voltage $LV_{12}$ and the timing pulse T1 by altering the magnitude of its output signal in a manner that is related to the distance the mirror 7 must be moved to position the beam B for printing the line L12. The output signal of the drive signal generator 3 is applied to the amplifier 4, and the resulting position voltage $LV'_{12}$ generated by the amplifier is applied as one input to the galvanometer drive amplifier 5. The galvanometer drive amplifier 5 responds to the application of the position voltage $LV'_{12}$ by generating a galvanometer drive current that, in the absence of a correction voltage, would result in the galvanometer 6 rotating the mirror 7 to position the beam B at approximately the location L12 in section 3 of the page 10 where the next line of information is to be printed. Such approximate positioning of the beam B would be due to the previously discussed non-linear operating characteristics of the galvanometer 6.

As previously mentioned, the digital code LP (FIG. 1), which represents the line address of the line L12, is also applied as an input to the linearity correction circuit 2. After the output of the drive signal generator 3 has been altered as a result of the generation of the digital code LP, and the position signal $LV'_{12}$ is present at the output of the amplifier 4, the control unit 14 generates a timing signal T2 that enables the linearity correction circuit 2. The simultaneous application of the digital code LP and the timing signal T2 to the linearity correction circuit 2 results in that circuit generating a correction voltage $CV_3$ that is applied to the second input of the galvanometer drive amplifier 5. It will be recalled that the correction voltage $CV_3$ (FIG. 5) is associated with section S3 of the page 10, and it is of such magnitude that when it is summed with a position voltage $LV'_i$ applied to the galvanometer drive amplifier 5 which identifies a line in section S3 of the page 10, the output of the galvanometer drive amplifier 5 is altered to substantially eliminate the effect of non-linear galvanometer operation on beam positioning in that section of the page. Consequently, the simultaneous application of the voltages $LV'_{12}$ and $CV_3$ to the inputs of the galvanometer drive amplifier 5 results in the amplifier generating a corrected drive current of such a magnitude that the mirror 7 rotates the required amount to accurately position the beam B at the proper position for printing the line L12 in section S3 of the page.

After the line L12 (FIG. 1) has been printed, the mirror 7 is rotated to position the beam B for printing the next line L13 in section S4 of the page 10. Since this line L13 is in section S4 of the page 10, the previously discussed operations performed in generating the galvanometer drive current required to rotate the mirror 7 will be performed using a line position voltage $LV'_{13}$ and a correction voltage $CV_4$ associated with this line and page section. Similarly, as lines are printed in each succeeding section $S_i$ of the page 10, the correction voltage $CV_i$ associated with the section $S_i$ will be applied to one input of the galvanometer drive amplifier 5 to provide a corrected galvanometer drive current that compensates for the non-linear operation of the galvanometer during positioning of a beam in that page section. In essence, the effects of non-linear galvanometer operation in positioning the beam B in a section of the page 10 are compensated for by varying the amount the galvanometer drive current is corrected during the positioning of the beam B as a function of the section in which the beam is positioned.

Obviously, the previously mentioned linearity correction circuit 2 (FIG. 1) may be any circuit that provides correction signals in the manner described above. For purposes of discussion, a detailed block diagram of an illustrative linearity correction circuit 2 (FIG. 1) is shown in FIG. 2. This illustrative linearity correction circuit utilizes a power supply 20 and a network of variable resistances $R_1$ through $R_n$ to store the empirically determined correction voltages $CV_1$ through $CV_n$. The tap on each variable resistance is adjusted to provide a portion of the voltage dropped across the resistor that is equal to one of the correction voltages. The voltages present at the taps of the resistances are connected as inputs to an analog multiplexer 21 to provide the correction voltages $CV_1$ through $CV_n$ that are associated with the various sections of the page 10 (FIG. 1).

The analog multiplexer 21 (FIG. 2) may be any one of numerous well-known switching circuits, such as, for example, the Model DG 506 analog multiplexer commercially available from Siliconix, Santa Clara, Calif. Generally, the function of the analog multiplexer is to apply the correction voltage $CV_i$ associated with the section $S_i$ as an input to the galvanometer drive amplifier during the intervals that the beam B is positioned in that section. As previously mentioned, when the vertical positioning of the beam B is to be changed, a digital line position code LP is applied to the digital-to-analog converter 1, and a selected portion of the line position code LP is also applied as an input to the linearity correction circuit 2. The number of bits in the digital line position code LP that are applied to the linearity correction circuit 2 may include all of the bits in the code or only those bits occupying a fractional portion of the bit positions in the code. In essence, the bit pattern applied to the linearity correction circuit 2 need only contain sufficient information to indicate the section of the page 10 in which the line identified by the line position code LP is to be printed. When the selected portion of the line position code LP and timing signal T2 are applied to the linearity correction circuit 2, the analog multiplexer 21 responds by applying a voltage $CV_i$ associated with the page section $S_i$ identified by the applied code bits to an input of the galvanometer drive amplifier 5 (FIG. 1). More specifically, when the digital line position code LP applied to the beam position circuit 13 (FIG. 1) identifies the line L12, in section 3 of the page 10, the analog multiplexer 21 (FIG. 2) responds to the portion of this code applied to it by applying the correction voltage $CV_3$ associated with section S3 of the page as an input to the galvanometer drive amplifier 5 (FIG. 1). Similarly, if the digital line position code LP identifying the line L12 in section S3 of the page 10 is replaced with a line position code identifying a line in section S4 of the page as the input to the beam position circuit 13 (FIG. 1), the analog multiplexer 21 (FIG. 2) responds by applying the correction voltage $CV_4$ associated with the section S4 of the page 10 as an input to the galvanometer drive amplifier 5 (FIG. 1). In this manner, the correction voltage $CV_i$ applied as an input to the galvanometer drive amplifier 5 changes in synchronism with changes in the section $S_i$ in which the beam B is positioned on a page, and provides automatic compensation for variations in the operating characteristics of the galvanometer as it scans the beam B from section to section on the page.

While the illustrative embodiment involves compensation for the non-linear operating characteristics of a galvanometer-driven mirror that vertically positions a beam on a page, it is obvious that the invention can be readily adapted for use where the galvanometer-driven mirror positions the beam horizontally on the page. Similarly, it is apparent that the invention may be used to compensate for the non-linear operating characteristics of numerous types of beam deflecting devices that may differ significantly from a galvanometer-driven mirror.

The invention has been described in detail with particular reference to illustrative embodiments thereof, but it will be understood that variations and modifications can be effected within the spirit and scope of the invention.

What is claimed is:

1. In a character recording apparatus for recording characters on a light sensitive medium including means for forming at least one beam of light for use in character recording, a first mirror for scanning said beam in a first direction to form at least portions of characters generally arranged in a line and a second mirror movable in a second direction relative to said first direction to positions respectively corresponding to lines of a page, said first direction being along such lines and said second direction being between topmost and bottommost ones of such lines of the page, and first and second galvanometers coupled to said first and second mirrors and responsive to first and second drive signals for respectively scanning and positioning said first and second mirrors, apparatus for producing such second drive signal comprising:

a. means for producing a code signal having an information content representative of the position of a line of a page on which characters are to be formed;
b. linear signal producing means responsive to said code signal for producing a linear output signal corresponding to such line;
c. linearity correction circuit means responsive to such code signal for producing a correction signal which is a function of the position of such line on the page; and
d. means responsive to said linear output signal and said linearity correction signal for producing such second drive signal and providing it as an input to said second galvanometer whereby said second galvanometer is moved to a position corresponding to such line on the page.

2. The invention as set forth in claim 1 wherein said linearity correction circuit means includes a plurality of correction signal sources corresponding to different positions of lines on a page and an analog multiplexer responsive to said code signal to select one of said signal sources corresponding to such line to provide said correction signal.

3. The invention as set forth in claim 2 wherein said code signal is a digital signal and wherein said linear signal producing means includes a digital to analog converter responsive to said code signal to produce said linear output signal.

* * * * *